(12) United States Patent
McCawley et al.

(10) Patent No.: US 12,448,003 B2
(45) Date of Patent: Oct. 21, 2025

(54) ALGORITHM FOR THE AV TO SAFELY RESPOND TO A CUT-IN VEHICLE

(71) Applicant: GM Cruise Holdings LLC, San Francisco, CA (US)

(72) Inventors: Travis Reese McCawley, Seattle, WA (US); Christopher Charles Ward, Kensington, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 504 days.

(21) Appl. No.: 18/149,835

(22) Filed: Jan. 4, 2023

(65) Prior Publication Data

US 2024/0217552 A1 Jul. 4, 2024

(51) Int. Cl.
*B60W 60/00* (2020.01)

(52) U.S. Cl.
CPC ..... *B60W 60/0015* (2020.02); *B60W 2510/18* (2013.01); *B60W 2554/4041* (2020.02); *B60W 2554/4042* (2020.02); *B60W 2554/4045* (2020.02); *B60W 2554/802* (2020.02); *B60W 2554/804* (2020.02); *B60W 2720/10* (2013.01); *B60W 2720/106* (2013.01)

(58) Field of Classification Search
CPC ......... B60W 60/0015; B60W 2510/18; B60W 2554/4041; B60W 2554/4042; B60W 2554/4045; B60W 2554/802; B60W 2554/804; B60W 2720/10; B60W 2720/106; B60W 30/09; B60W 30/16
See application file for complete search history.

(56) References Cited

U.S. PATENT DOCUMENTS

| | | | |
|---|---|---|---|
| 2022/0001859 A1* | 1/2022 | Park | B60W 30/18163 |
| 2024/0217552 A1* | 7/2024 | McCawley | B60W 60/0015 |

* cited by examiner

*Primary Examiner* — Ashley L Redhead, Jr.
(74) *Attorney, Agent, or Firm* — CANTOR COLBURN LLP

(57) ABSTRACT

Systems and methods are provided for determining a required following behavior when a road actor or vehicle cuts in front of an autonomous vehicle. The appropriate following behavior depends on various factors including road and weather conditions, recovery time gap, minimum time gap for the autonomous vehicle speed, distance between the autonomous vehicle and cut-in vehicle, speed of the autonomous vehicle at the time of cut-in, speed of the cut-in vehicle, time to collision threshold for hard braking, and time to collision threshold for normal braking. Types of following behaviors include emergency deceleration, aggressive deceleration, moderate deceleration, recovery deceleration, some deceleration or following without deceleration. In some examples, the recovery time gap can be set to 3 or more seconds. In some examples, it is set to below 3 seconds. As the recovery time gap increases, the following distance between the autonomous vehicle and a leading vehicle increases.

20 Claims, 10 Drawing Sheets

ALGORITHM FOR THE AV TO SAFELY RESPOND TO A CUT-IN VEHICLE

TECHNICAL FIELD

The present disclosure generally relates to autonomous vehicles and, more specifically, to systems and methods for safely responding to another vehicle who comes into the path of an autonomous vehicle.

BACKGROUND

An autonomous vehicle is a motorized vehicle that can navigate without a human driver. Automation technology in and on the autonomous vehicle permit it to navigate public roadways and any other pathway by sensing its surroundings without human input. For example, road signs, streets and intersections, traffic lights and other objects can be swiftly recognized using the automation technology. The autonomous vehicle can be used to provide transportation and delivery services of both people and goods. For instance, a customer may be picked up at a designated location and then dropped off at their selected destination.

Vehicles including those with and without drivers generally operate at distances deemed to be safe so that each vehicle would have enough time to slow down or brake as needed. As with a conventional vehicle with a driver, the autonomous vehicle may be required to respond to another vehicle that is performing unsafe maneuvers or otherwise operating in an unsafe manner.

SUMMARY

Systems and methods are provided for an autonomous vehicle response to a cut-in vehicle when a vehicle cuts in front of the autonomous vehicle. The autonomous vehicle determines the speed and distance of the cut-in vehicle relative to itself. Based on an assessment or calculation to maintain a time gap between the autonomous vehicle and the cut-in vehicle, the autonomous vehicle can either take action such as decelerating. If the time gap can be maintained without taking action, the autonomous vehicle will not decelerate or otherwise alter its speed in response to the cut-in vehicle.

According to one aspect, a system an autonomous vehicle is provided which includes an onboard controls system that includes a speed control component that monitors and controls speed, acceleration and deceleration of the autonomous vehicle and determines a following behavior when a cut-in vehicle cuts in front of the autonomous vehicle; an object sensing component that detects the cut-in vehicle moving into a path of the autonomous vehicle and communicates detection of the cut-in vehicle to the speed control component; an external speed detection component that detects speed data of the cut-in vehicle and communicates the speed data to the speed control component, wherein the speed control component determines an amount of deceleration necessary for the autonomous vehicle based on a recovery time gap, distance between the autonomous vehicle and the cut-in vehicle, the speed of the cut-in vehicle relative to the autonomous vehicle speed, and time to collision.

According to another aspect, a method for determining a following behavior for an autonomous vehicle relative to a cut-in vehicle that cuts in front of the autonomous vehicle comprising includes determining a longitudinal gap distance between the autonomous vehicle and the cut-in vehicle; determining a longitudinal distance associated with the front buffer of the autonomous vehicle; determining a time gap of the autonomous vehicle relative to the cut-in vehicle; and determining a minimum time gap for the autonomous vehicle speed.

According to another aspect, a method for determining a following behavior for an autonomous vehicle relative to a leading vehicle that cuts in front of the autonomous vehicle includes determining a longitudinal gap distance between the autonomous vehicle and the cut-in vehicle; determining a longitudinal distance associated with the front buffer of the autonomous vehicle; determining a time gap of the autonomous vehicle relative to the cut-in vehicle; determining a minimum time gap for the autonomous vehicle speed based on detected road conditions; determining a time to collision of the autonomous vehicle relative to the cut-in vehicle; determining a hard braking time to collision threshold for the autonomous vehicle; determining a normal braking time to collision threshold for the autonomous vehicle; and selecting an amount of deceleration as the following behavior based on the road conditions and which of any thresholds relating to the longitudinal gap distance, the longitudinal distance, the time gap, the minimum time gap for the autonomous vehicle speed, the time to collision threshold for hard and normal braking have been exceeded.

The systems and methods as described herein are also applicable to sudden or unexpected braking of a leading vehicle in front of the autonomous vehicle that did not cut in front of the autonomous vehicle.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology, are not necessarily drawn to scale unless indicated as such and would not limit the scope of the present technology to these examples. Furthermore, the skilled artisan will appreciate the principles of the present technology as described and explained with additional specificity and detail through the use of the accompanying drawings in which.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

When an autonomous vehicle (AV) is following a leading vehicle, the autonomous vehicle through its onboard computer employs protocols or reference trajectories in which the relevant following behavior is satisfied. The protocols provide a minimum time gap for the autonomous vehicle to maintain in various scenarios relative to the leading vehicle. Other vehicles or road actors may choose to cut in front of the autonomous vehicle at any moment and at virtually any speed or dynamic state. The vehicle cutting in front of the autonomous vehicle or otherwise encroaching in the path of the autonomous vehicle can be referred to as a cut-in vehicle. Responding to the cut-in vehicle safely and comfortably is not always possible in view of traffic or roadway conditions, and the optimal autonomous vehicle behavior may not be obvious.

For instance, if the cut-in vehicle cuts in front of the autonomous vehicle at 1 meter in front of the autonomous vehicle going the same speed, the systems and methods provided herein facilitate determining how hard the autonomous vehicle should brake or decelerate to recover or resume a comfortable and safe time gap. Alternatively, the cut-in vehicle could be going slower than the autonomous vehicle and the cut-in distance in front of the autonomous vehicle could be less. Numerous cut-in situations are possible.

The systems and methods described herein provide a logical flow that defines example autonomous behavior based on a combination of factors including but not limited to distance, time gap, and time to collision to the cut-in vehicle. In addition, discrete braking levels have been mapped to cut-in situations to demonstrate a proportional response to mitigate risk, and the protocols are tuned to ensure consistent and expected responses and recovery time.

Figure 1:
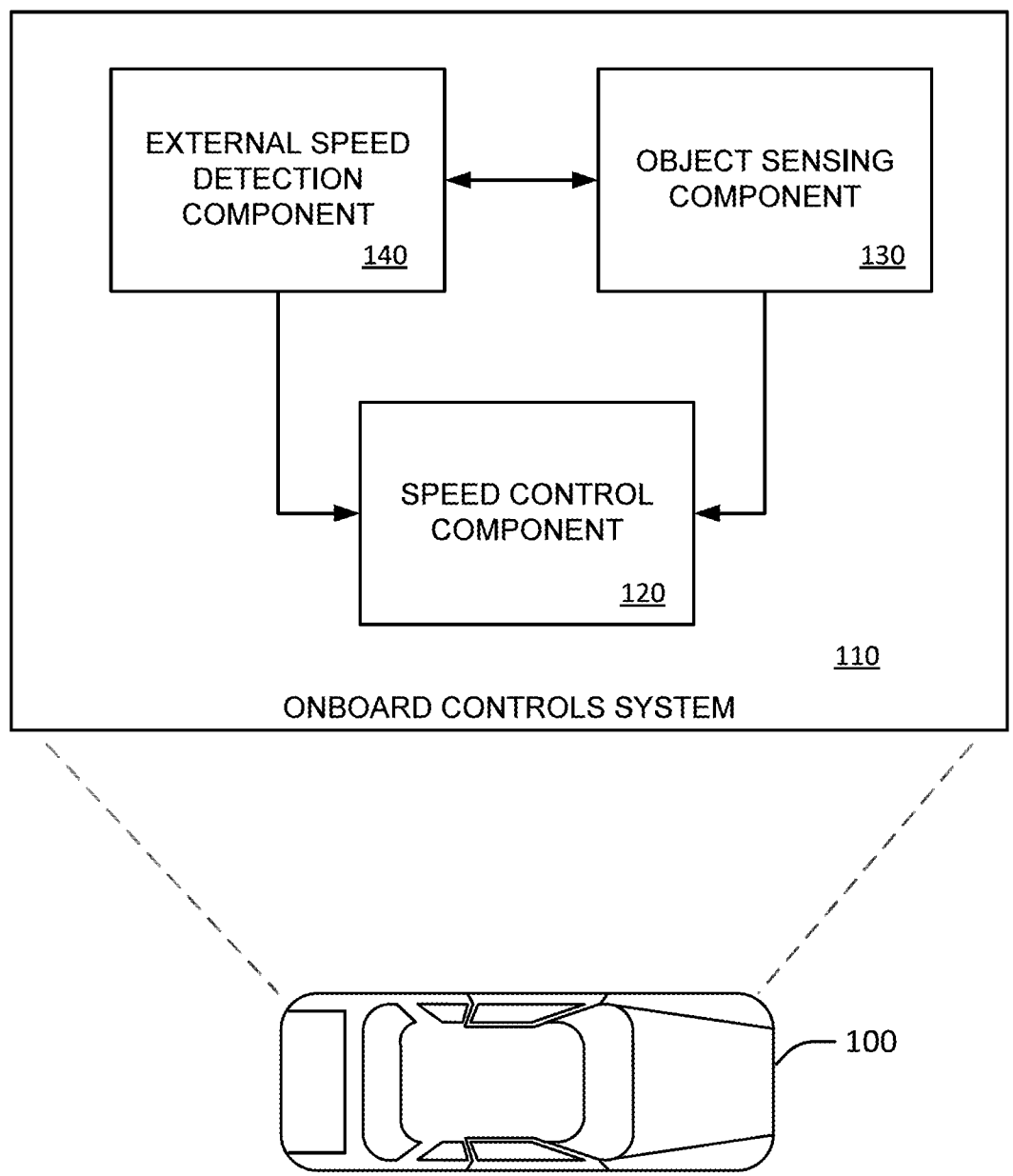
FIG. 1 is a diagram illustrating an autonomous vehicle configured to safely respond to a cut-in vehicle according to some embodiments of the disclosure.

FIG. 1 provides a diagram of a system 100 that determines a following behavior for an autonomous vehicle behind a cut-in vehicle (e.g., the vehicle that cuts in front of the autonomous vehicle). The system includes an onboard controls system 110 that controls operation of an autonomous vehicle and communicates with remote operation services/systems. The onboard controls system 110 comprises a speed control component 120 that monitors and maintains the speed, acceleration, and deceleration of the autonomous vehicle 100 as well as the time gap and distance when following a leading vehicle. The onboard controls system 110 also comprises an object sensing component 130 that senses objects including vehicles around and surrounding the autonomous vehicle. The object sensing component 130 can detect a vehicle cutting in front of the autonomous vehicle, a motorized bike lane-splitting as well as a vehicle that swerves momentarily in front of the autonomous vehicle.

The object sensing component 130 can also determine a distance between the autonomous vehicle and the vehicle cutting in or otherwise positioned in front of the autonomous vehicle as the leading vehicle. The data from the object sensing component can be communicated to the speed control component 120 as well as with an external speed detection component 140. The external speed detection component 140 communicates with the object sensing component 130 and detects the speed of the leading vehicle directly in front of the autonomous vehicle and communicates the data to the speed control component 120.

The speed control component 120 follows a protocol which determines that an appropriate or required following behavior is satisfied. If a passenger is present in the autonomous vehicle, the required behavior balances safety and comfort. Required following behaviors can include the following deceleration or braking behaviors: emergency braking, aggressive braking, moderate braking, recovery braking, any braking and following.

Emergency braking means minimum planned jerk, and acceleration, which is subject to the maximum achievable acceleration and jerk dictated by the available road surface traction, should be no greater than the emergency jerk and acceleration limits for longitudinal deceleration. Aggressive braking involves minimum planned jerk, and acceleration should be no greater than the aggressive jerk and acceleration limits for longitudinal deceleration. Moderate braking means minimum planned jerk, and acceleration should be no greater than the moderate jerk and acceleration limits for longitudinal deceleration.

With recovery braking, the autonomous vehicle should recover to a minimum time gap ($TG_{min}$) within about N seconds of the first moment a time gap of the autonomous vehicle ($TG_{AV}$) is less than the minimum time gap ($TG_{min}$). In some embodiments, N is greater than 1.0 second which means that the recovery time gap is greater than 1 second such as 1.5 seconds or 3 seconds. In other embodiments, N is greater than or equal to 4.0 seconds.

With any braking, the minimum planned jerk or acceleration should be less than zero; and when following, this means no additional constraints are imposed by the protocol.

The parameters involved in determining the required following behavior include:

$d_{gap}$ [m] is the longitudinal gap distance between the AV and the leading NPC vehicle $d_{min}$ [m] is the longitudinal distance associated with the 95th percentile limit for longitudinal positional uncertainty $d_{buffer}$ [m] is the longitudinal distance associated with the front buffer of the AV $TG_{AV}$ [s] is the time gap of the AV (eqn. 1—see below)

$TG_{min}$ is the minimum time gap for the AV speed $TTC_{AV}$ is the time to collision of the AV (eqn. 2—see below)

$TTC_{br,hard}$ is the time to collision threshold for hard braking [1] (eqn. 3—see below)

$TTC_{br,normal}$ is the time to collision threshold for normal braking [1] (eqn. 4—see below)

$t_{delay}$ is the Control System and actuator response delay.

The following equations are utilized in determining the required following behavior:

$$TG_{AV} = \frac{d_{gap}}{v_{AV}} \qquad \text{eqn. 1}$$

$$TTC_{AV} = \begin{cases} \infty & v_{NPC} \geq v_{AV} \\ \frac{d_{gap}}{v_{AV} - v_{NPC}} & v_{NPC} < v_{AV} \end{cases} \qquad \text{eqn. 2}$$

$$TTC_{br,hard} = 0.045 \cdot v_{AV} + 0.875 + t_{delay} \qquad \text{eqn. 3}$$

$$TTC_{br,normal} = 0.067 \cdot v_{AV} + 1.56 + t_{delay} \qquad \text{eqn. 4}$$

An autonomous vehicle can be configured to determine a following behavior for an autonomous vehicle behind a cut-in vehicle as described in FIG. 1 as well as incorporating the methods discussed herein.

Figure 2:
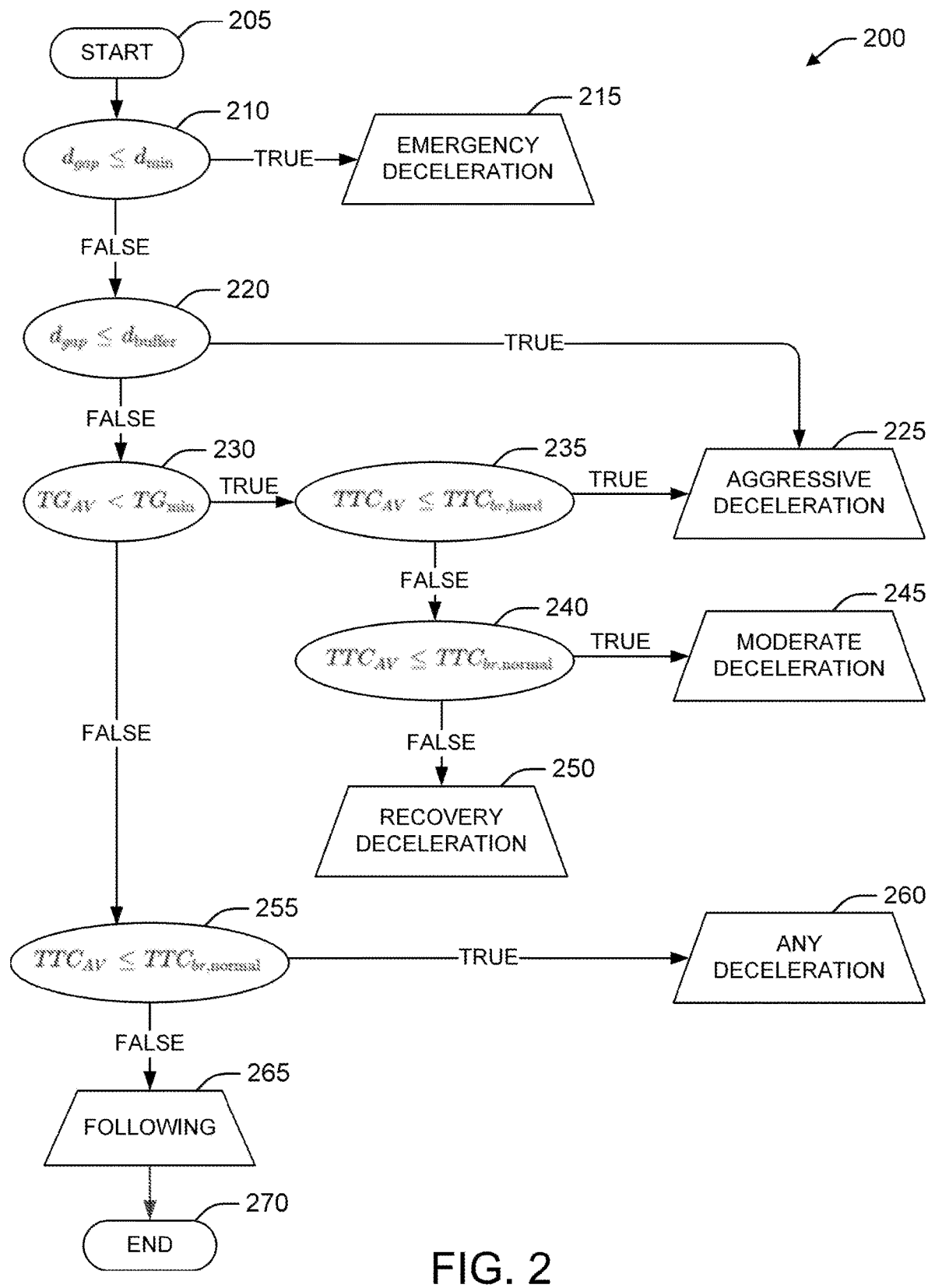
FIG. 2 is a diagram of a method for autonomous vehicle safe-response protocol to a cut-in vehicle, according to some embodiments of the disclosure.

Using the above parameters and equations, FIG. 2 presents a diagram of an example method 200 for determining a required following behavior of the autonomous vehicle in response to the cut-in vehicle. It should be appreciated that the cut-in vehicle may also be referred to as a leading vehicle behind which the autonomous vehicle is following.

Upon starting at 205, the method 200 determines at 210 whether a longitudinal gap distance between the autonomous vehicle and the leading vehicle (NPC or cut-in vehicle) is less than or equal to the longitudinal distance associated with a set limit for longitudinal positional uncertainty ($d_{gap} \leq d_{min}$). For instance, the set limit could be at least the $90^{th}$ percentile, at least the $95^{th}$ percentile or higher. In some embodiments as discussed herein, the set limit is the $95^{th}$ percentile. If the statement at 210 is true, then the autonomous vehicle performs emergency braking at 215.

If the statement at 210 is false, then the method determines at 220 whether the longitudinal gap distance between the autonomous vehicle and the leading NPC vehicle is less than or equal to the longitudinal distance associated with the front buffer of the autonomous vehicle ($d_{gap} \leq d_{buffer}$). If the determination at 220 is true, then the autonomous vehicle performs aggressive braking or aggressive deceleration at 225.

However, if the determination at 220 is false, then method proceeds to statement 230 where it is determined whether the calculated time gap of the autonomous vehicle is less than the minimum time gap for the autonomous vehicle's speed ($TG_{AV} < TG_{min}$). If the time gap of the autonomous vehicle is less than the minimum time gap at the autonomous vehicle's speed, then the method determines at 235 whether the time to collision of the autonomous vehicle is less than or equal to the time to collision threshold for hard braking ($TTC_{AV} \leq TTC_{br,hard}$). If the statement at 235 is true, then the autonomous vehicle performs aggressive braking at 225.

If the statement at 235 is false, then the method determines at 240 if the time to collision of the autonomous vehicle is less than or equal to the time to collision threshold for normal braking ($TTC_{AV} \leq TTC_{br,normal}$). If that statement at 240 is true, then the autonomous vehicle moderately brakes or decelerates in response to the cut-in vehicle at 245. On the other hand, if it is false at 240, then recovery braking at 250 is performed.

Referring to again to the statement at 230, if that statement is false, then the time gap of the autonomous vehicle is not less than the minimum time gap at the autonomous vehicle's speed. Following therefrom, the method determines at 255 if the time to collision of the autonomous vehicle is less than or equal to the time to collision threshold for normal braking ($TTC_{AV} \leq TTC_{br,normal}$). If the statement at 255 is true, then the autonomous vehicle can perform any deceleration at 260. However, if the statement is false, then the autonomous vehicle can proceed with following the cut-in (or leading) vehicle at 265 and the method terminates at 270.

Figure 3:
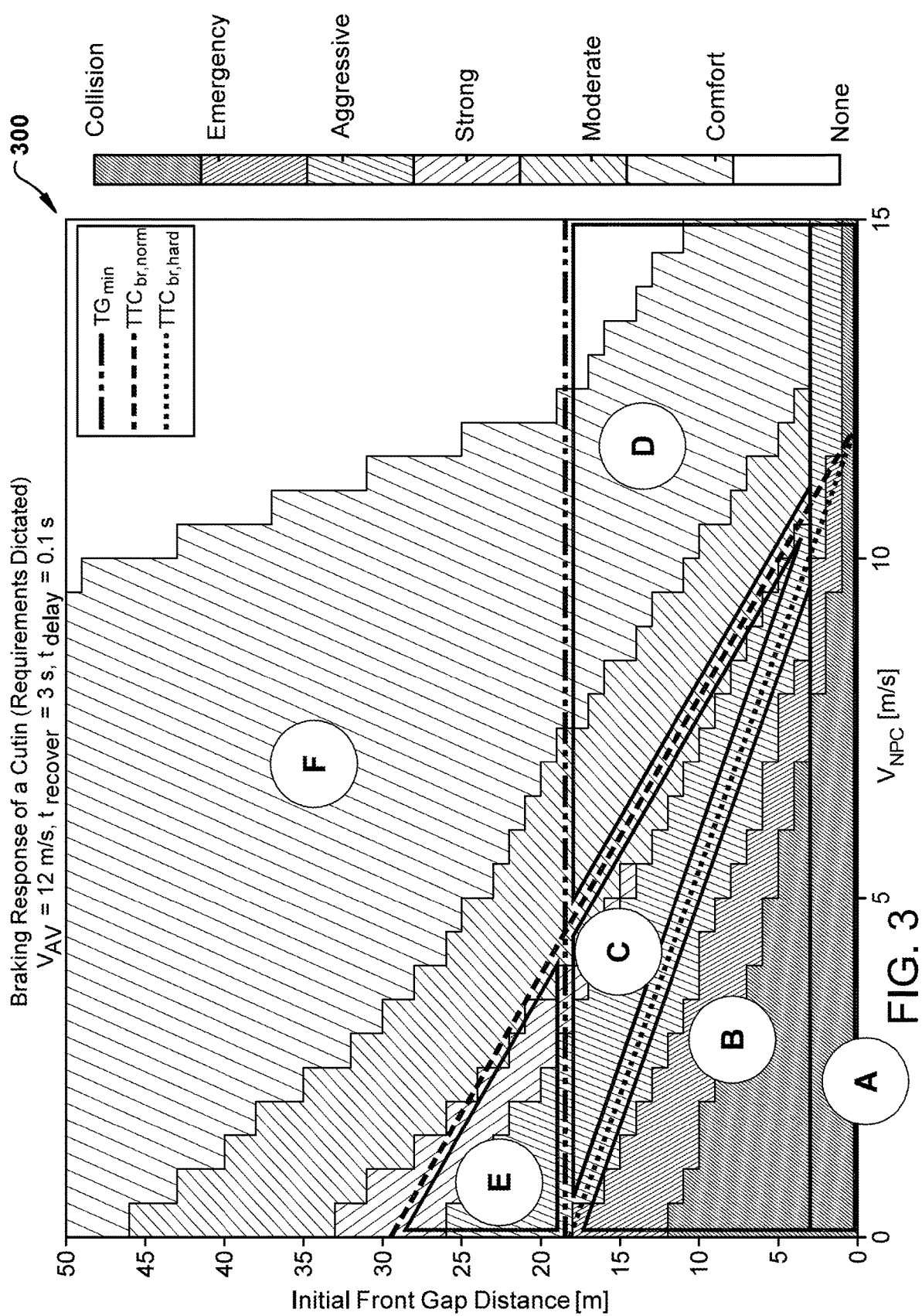
FIG. 3 is a graphical diagram of an example simulation that was performed based on a safe-response protocol to a cut-in vehicle, according to some embodiments of the disclosure.

FIG. 3 is graphical diagram 300 of a simulation performed to illustrate different braking responses to a cut-in vehicle to avoid a collision and maintain safety for the passenger in the autonomous vehicle. The simulation was performed to validate that the proposed method of FIG. 2 is reasonable. The simulation utilizes constant jerk kinematic models of the autonomous vehicle and road actor (e.g., cut-in vehicle or NPC) which cuts in front of the autonomous vehicle at various distances and speeds, then continues at the same speed.

The simulation determines the lowest intensity (least negative) constant jerk ($j_{min}$) and minimum acceleration ($a_{min}$) (level of braking or deceleration) necessary to satisfy the above required steps in the method of FIG. 2 as well as basic collision avoidance. The scenario was simulated for 12 seconds, the collision threshold was set at 0 meters longitudinal distance between the autonomous vehicle and the cut-in vehicle, and a delay time of 0.1 seconds was used (to represent a minimum possible amount of delay from actuators only). The possible braking responses were discretized as follows:

TABLE 1

| Braking Level | $j_{min}$ [m/s³] | $a_{min}$ [m/s²] |
|---|---|---|
| None | 0.0 | 0.0 |
| Comfort | −5.0 | −1.8 |
| Moderate | −5.0 | −2.8 |
| Strong | −7.5 | −4.0 |
| Aggressive | −10.0 | −6.26 |
| Emergency | −34.0 | −8.34 |
| Collision | Even with Emergency braking, kinematically impossible to avoid a collision with braking only. | |

The simulation was run across multiple autonomous vehicle speeds; 12 m/s is shown in FIG. 3. The corresponding operating zones from the method discussed in FIG. 2 are indicated on the simulation results. It should be understood that this mapping of zones only applies to the initial state of the simulation. The indicated required level of braking or deceleration is the result of all 12 seconds of simulation (e.g., a threshold may be violated during the simulation but not at the start of it).

Required behavior responses to dynamic changes in both the current autonomous vehicle state as well as changes to the current leader or forward vehicle (cut-in/cut-out vehicle) are complex but ultimately revolve around the following objectives: ensure that the autonomous vehicle decelerates with an appropriate intensity to avoid a collision; ensure that the autonomous vehicle brakes with an appropriate intensity which the passengers as well as other road users may anticipate and feel comfortable with; and minimize an amount of time the autonomous vehicle spends in an unsafe following behavior but not at the cost of excessive discomfort.

Figure 4:
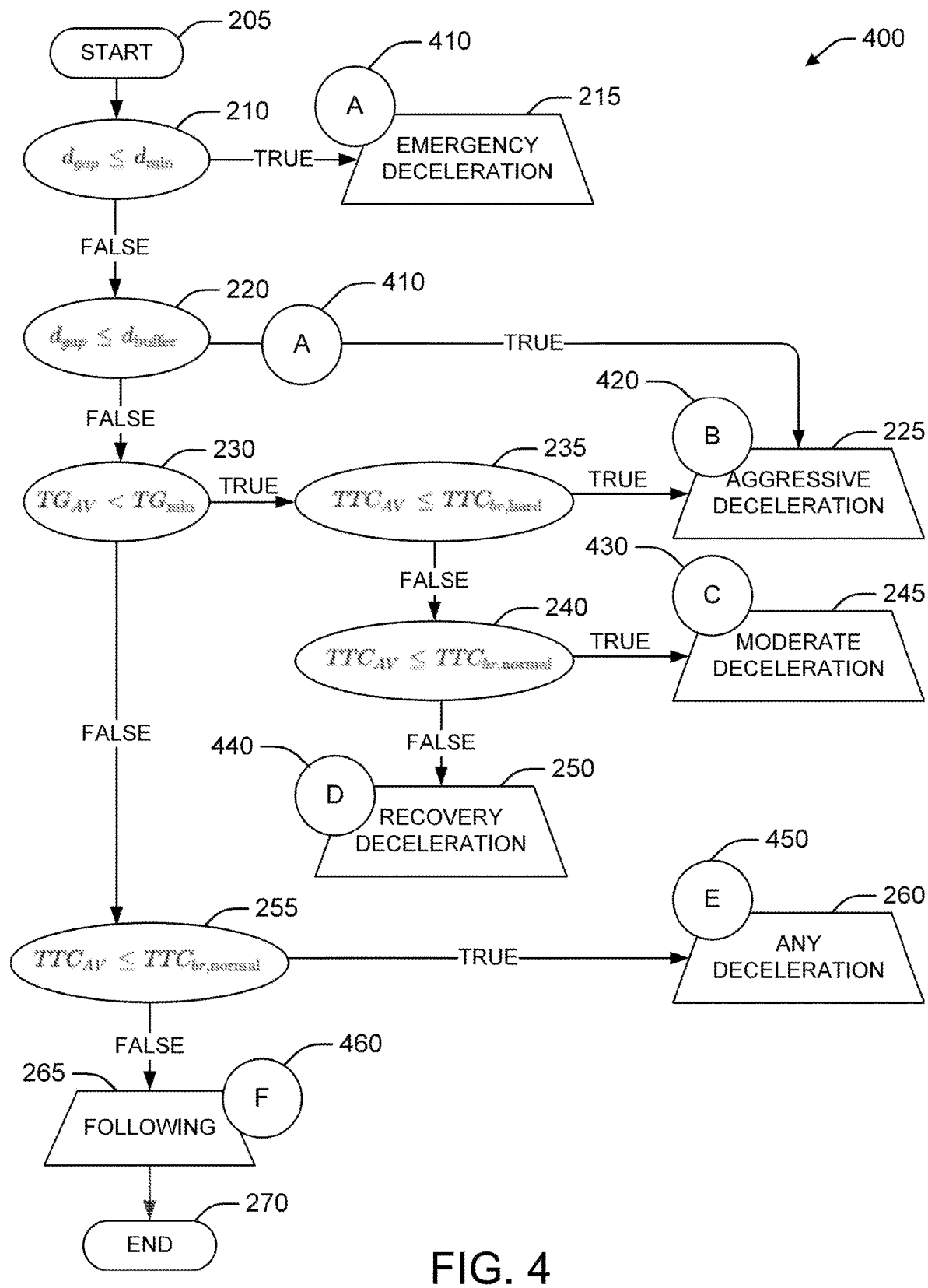
FIG. 4 is the diagram of FIG. 2 which correlates with the simulation depicted in FIG. 3, according to some embodiments of the disclosure.

The methods 200, 400 of FIG. 2 and FIG. 4 are derived from research regarding human expectations of braking response to a forward obstacle as well as values derived from kinematic models to ensure collision free behavior [See van der Horst, A. R. A., J. L de Kroes, and J. Moraal. "A Time-Based Analysis of Road User Behavior in Normal and Critical Encounters," Apr. 24, 1990, 142-43].

With reference to FIGS. 3 and 4, each zone illustrated in FIG. 4 based on the simulation performed and graphically illustrated in FIG. 3 is summarized as follows.

$d_{gap} \leq d_{min} \Rightarrow$ Emergency Braking (Zone A) 410—Emergency braking or deceleration is only called for when some set of circumstances leads to a forward vehicle (or prediction of a forward vehicle) coming extremely close to the autonomous vehicle (e.g., such as within 0.63 meters). This value corresponds to the 95th percentile of forward positional tolerance. Emergency braking is an extremely harsh event so this has been reserved for only the most dangerous scenario where a collision is nearly certain.

$d_{gap} \leq d_{buffer} \Rightarrow$ Aggressive Braking (Zone A) 410—In the event that the forward vehicle violates the front longitudinal buffer (e.g., 2.0 m) of the autonomous vehicle, the autonomous vehicle should be braking or decelerating. Because of expected positional uncertainty, there is insufficient probability that a collision can be avoided. However, in contrast to the emergency braking violation, this larger distance warrants more comfort and emergency braking can be downgraded to aggressive braking.

$TG_{AV} < TG_{min} \Rightarrow$ Braking—If no distance violation is expected, the method 200 checks if the minimum time gap is violated. This marks the threshold of kinematic safety. Following 265 at this distance could be unsafe because if the forward vehicle brakes sufficiently hard, it would be impossible for the autonomous vehicle to brake hard enough to avoid a collision. Some form of deceleration is required below this threshold, and the intensity of that deceleration is dictated by time to collision (TTC).

$TTC_{AV} \leq TTC_{br,hard}$ AND $TG_{AV} < TG_{min} \Rightarrow$ Aggressive Braking (Zone B) 420—The hard braking TTC threshold represents when humans expect "hard" braking to begin. Based on the same research referenced above [See van der Horst et al.], the deceleration associated with "hard" braking in the study is approximately −6 m/s² which corresponds well with the common definition of aggressive braking. While this level of braking may not be strictly necessary to avoid a collision, it is necessary to improve human comfort by providing a response which most humans would agree is appropriate given the circumstances.

$TTC_{AV} \leq TTC_{br,normal}$ AND $TG_{AV} < TG_{min} \Rightarrow$ Moderate Braking (Zone C) 430—If the hard braking time to collision (TTC) threshold is not exceeded (but the minimum time gap still is exceeded), the normal threshold is then checked. The value for normal braking (moderate) was derived from a study of Virginia Tech Transportation Institute (VTTI) normal braking data. The acceleration and jerk values correspond to the mean values during stop/start events. This value is considered comfortable when there is a contextually valid reason for a true stop. While this level of braking may not be strictly necessary to avoid a collision, it is necessary to improve human comfort by providing a response which most humans would agree is appropriate given the circumstances.

$TTC_{AV} > TTC_{br,normal}$ AND $TG_{AV} < TG_{min} \Rightarrow$ Recovery Braking (Zone D) 440—If the normal TTC threshold is not violated (but the minimum time gap still is), the AV should recover the minimum time gap in at most 3 seconds. The canonical scenario for this condition is a cut-in vehicle which is going faster than the autonomous vehicle but is relatively close. This is an interesting scenario because given the current state and/or prediction of the forward vehicle, there is no reason to believe a collision will occur (TTC is large). Given a perfect prediction, it would theoretically be safe to do nothing in this scenario; however, humans are unpredictable, and some braking is responsible. In order to be fundamentally kinematically safe, the autonomous vehicle should return to a time gap above the minimum; though how quickly the autonomous vehicle recovers that time gap is dictated by a balance of comfort and safety. A 3 second recovery time was determined by performing constant jerk kinematic simulations to understand the required braking level (jerk and accel) such that a given recovery time was satisfied. When recovery time is less than 3 seconds, it produces an inconsistent braking behavior relative to the other Zones of operation. Specific details on this are provided below regarding simulation results.

$TTC_{AV} \leq TTC_{br,normal}$ AND $TG_{AV} < TG_{min} \Rightarrow$ Any Braking (Zone E) 450—If the minimum time gap is not violated but the normal TTC threshold is, the autonomous vehicle simply must brake at any level. This situation arises if an NPC cuts in front of the AV at a relatively far distance but going slowly. As long as the autonomous vehicle has some acceleration and jerk targeted in the plan which are both negative, this requirement is satisfied. This is enforced because humans tend to expect braking at these TTCs, but kinematically the autonomous vehicle is safe and can always brake at a later time to avoid the collision. Practically speaking, this requirement is less restrictive than the basic collision avoidance requirement. A trajectory which avoids a collision seems to almost always necessitate braking in this region.

$TTC_{AV} > TTC_{br,normal}$ AND $TG_{AV} \geq TG_{min} \Rightarrow$ Following (Zone F) 460—If TTC is sufficiently large as well as time gap, there are no required behaviors from this design intent and the only kinematic restriction should be that of normal comfort limits. In this region there is no reasonable risk of collision or expectation of braking.

Figure 5:
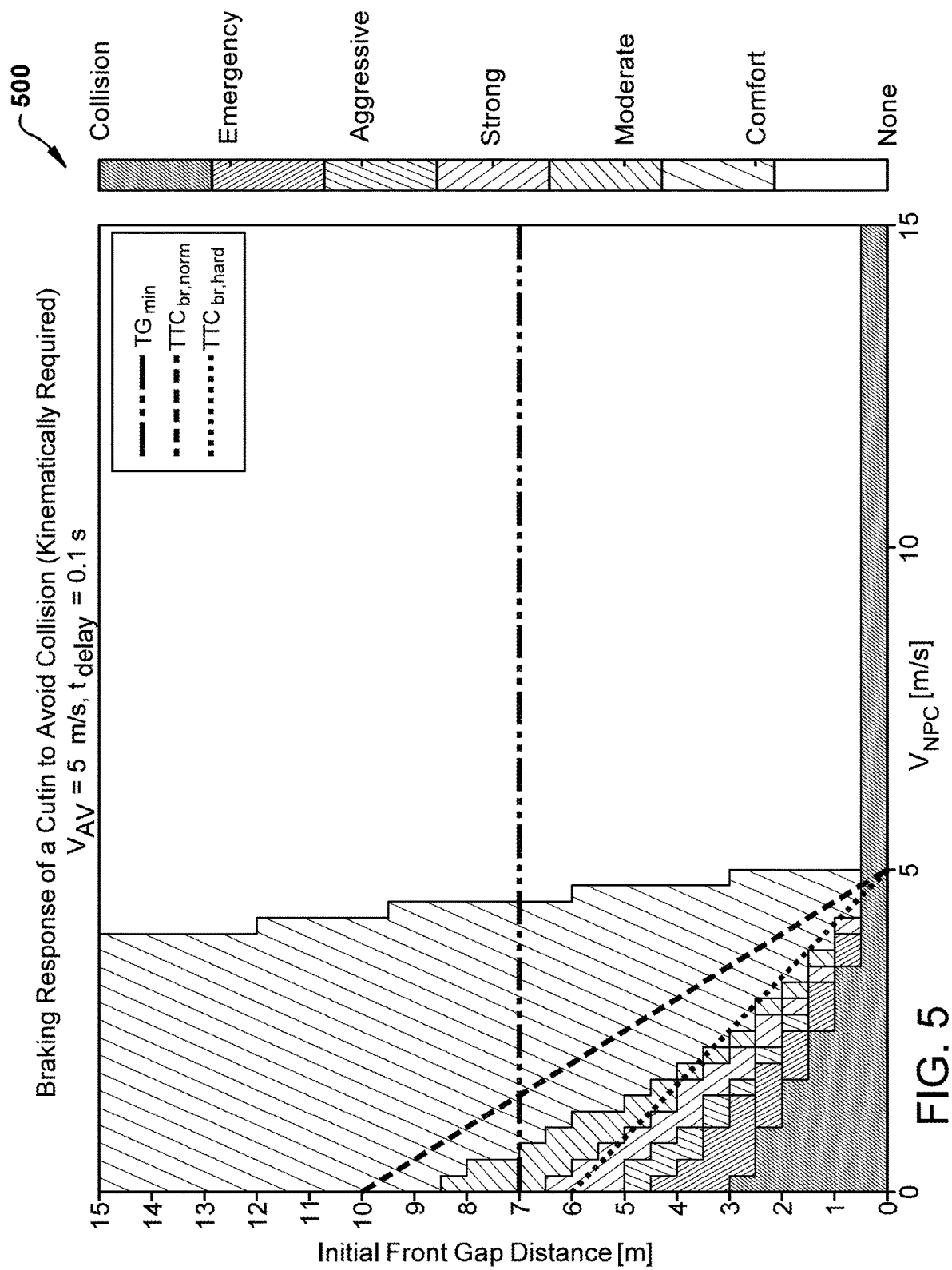
FIG. 5 is a graphical diagram of an example simulation that was performed based on a safe-response protocol to a cut-in vehicle, according to some embodiments of the disclosure.
Figure 6:
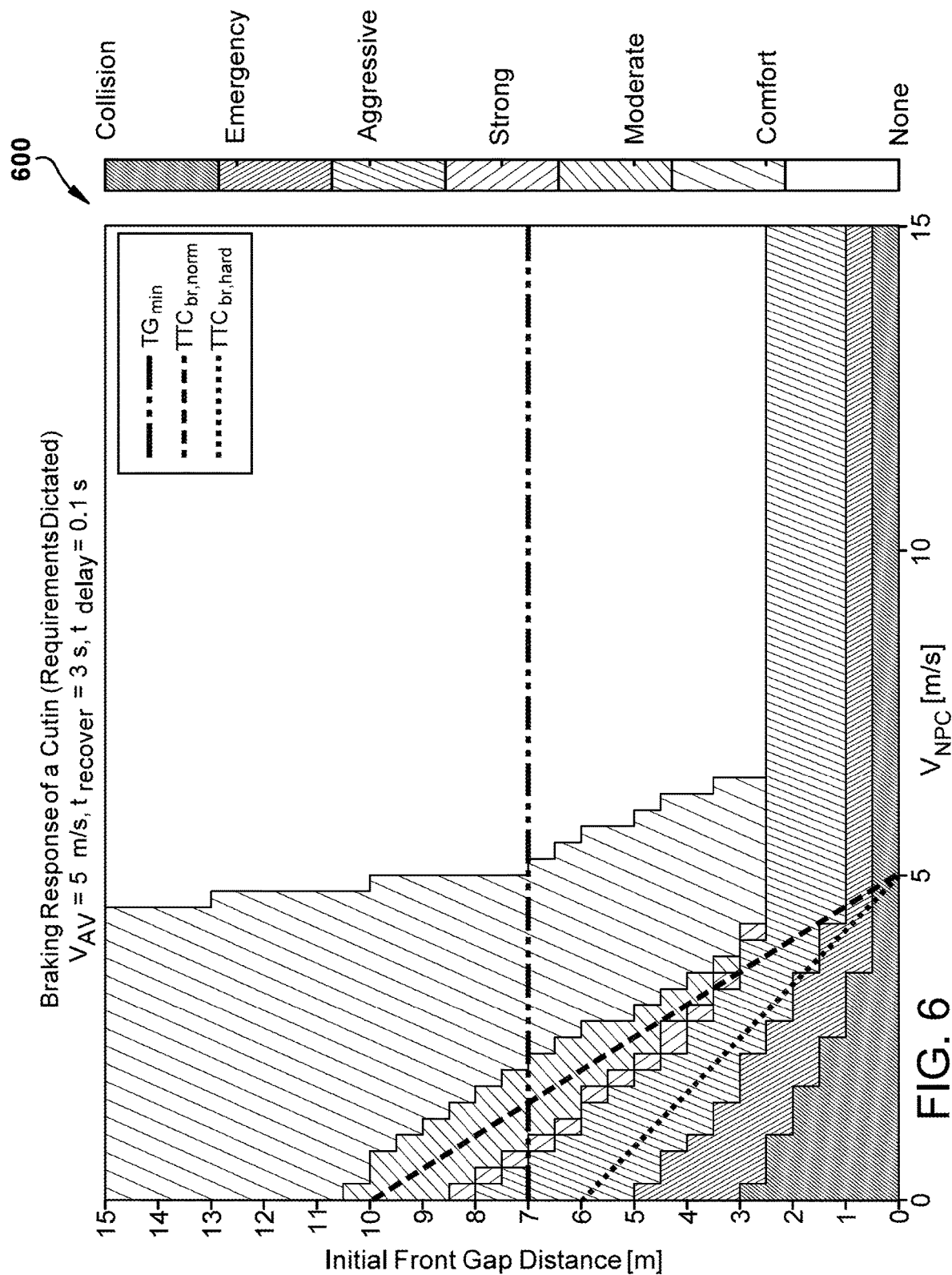
FIG. 6 is a graphical diagram of an example simulation that was performed based on a safe-response protocol to a cut-in vehicle, according to some embodiments of the disclosure.

FIGS. 5 and 6 provide graphical illustration of the required following behaviors or braking response according to kinematic requirements (FIG. 5) and the stated requirements as described above in FIG. 2 (FIG. 6) when an autonomous vehicle experiences a cut-in vehicle in order to avoid a collision with the cut-in vehicle. The graphical data 500 in FIG. 5 depicts an initial front gap (meters) between the autonomous vehicle and the cut-in vehicle as well as the speed (meters per second or m/s) of the cut-in vehicle. The graphical data 600 in FIG. 6 demonstrates the required behaviors as discussed above in FIG. 2 using the following set of parameters: the autonomous vehicle speed is 5 m/s, the recovery time gap is set at 3 seconds, and the Control system and actuator response delay is 0.1 second.

The graphical data 600 in FIG. 6 depicts relatively smooth correlation in the braking response in terms of the front gap distance relative to the speed of the cut-in vehicle at the time of cutting into the path of the autonomous vehicle. For example, as the front gap distance decreases and the speed of the cut-in vehicle increases at the time of cut-in, the braking response increases accordingly as indicated by the various patterns in the figure. The trend lines are relatively smooth in this simulation which indicates that the braking behavior is consistent and predictable.

Figure 7:
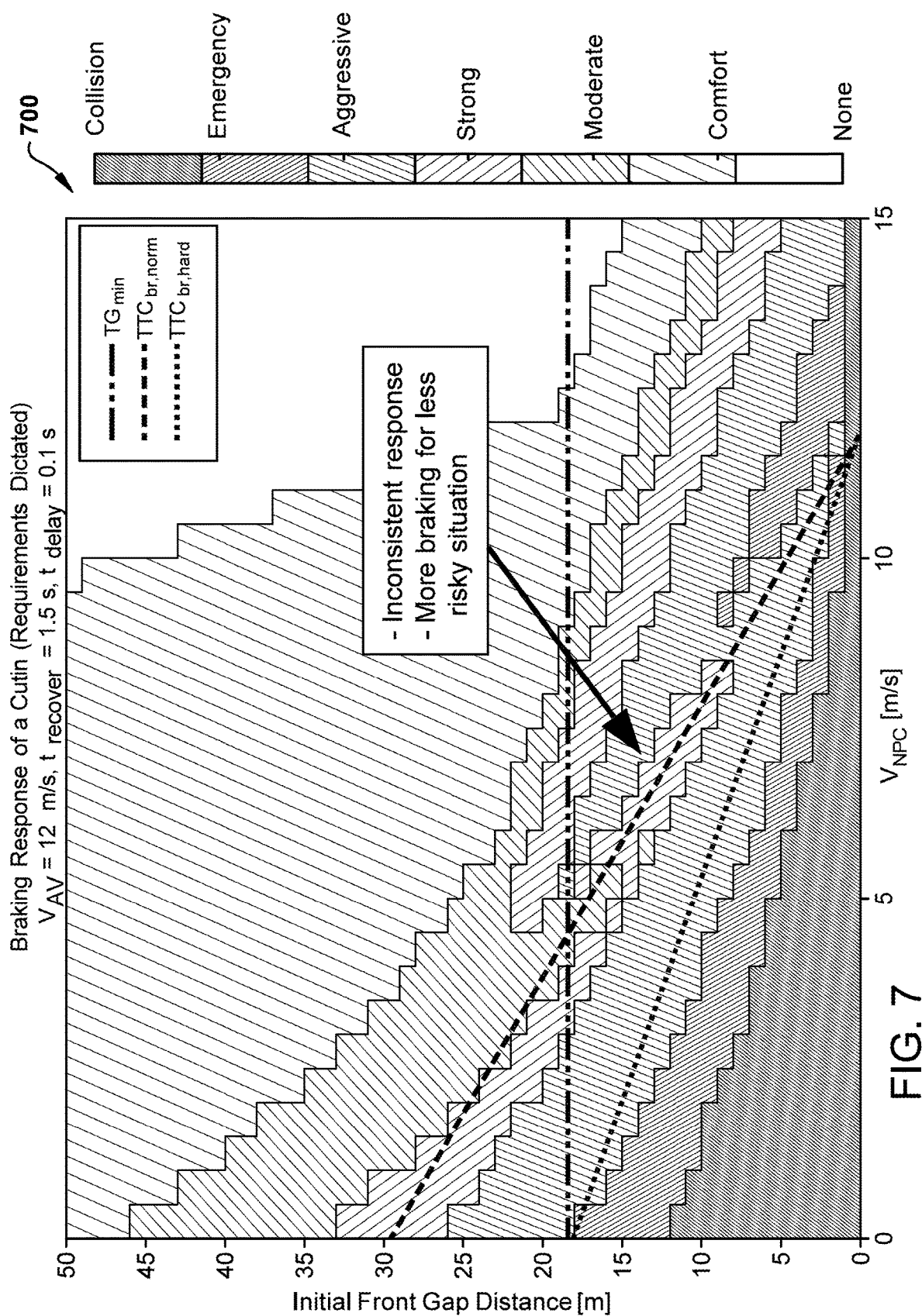
FIG. 7 is a graphical diagram of an example simulation that was performed based on a safe-response protocol to a cut-in vehicle, according to some embodiments of the disclosure.
Figure 8:
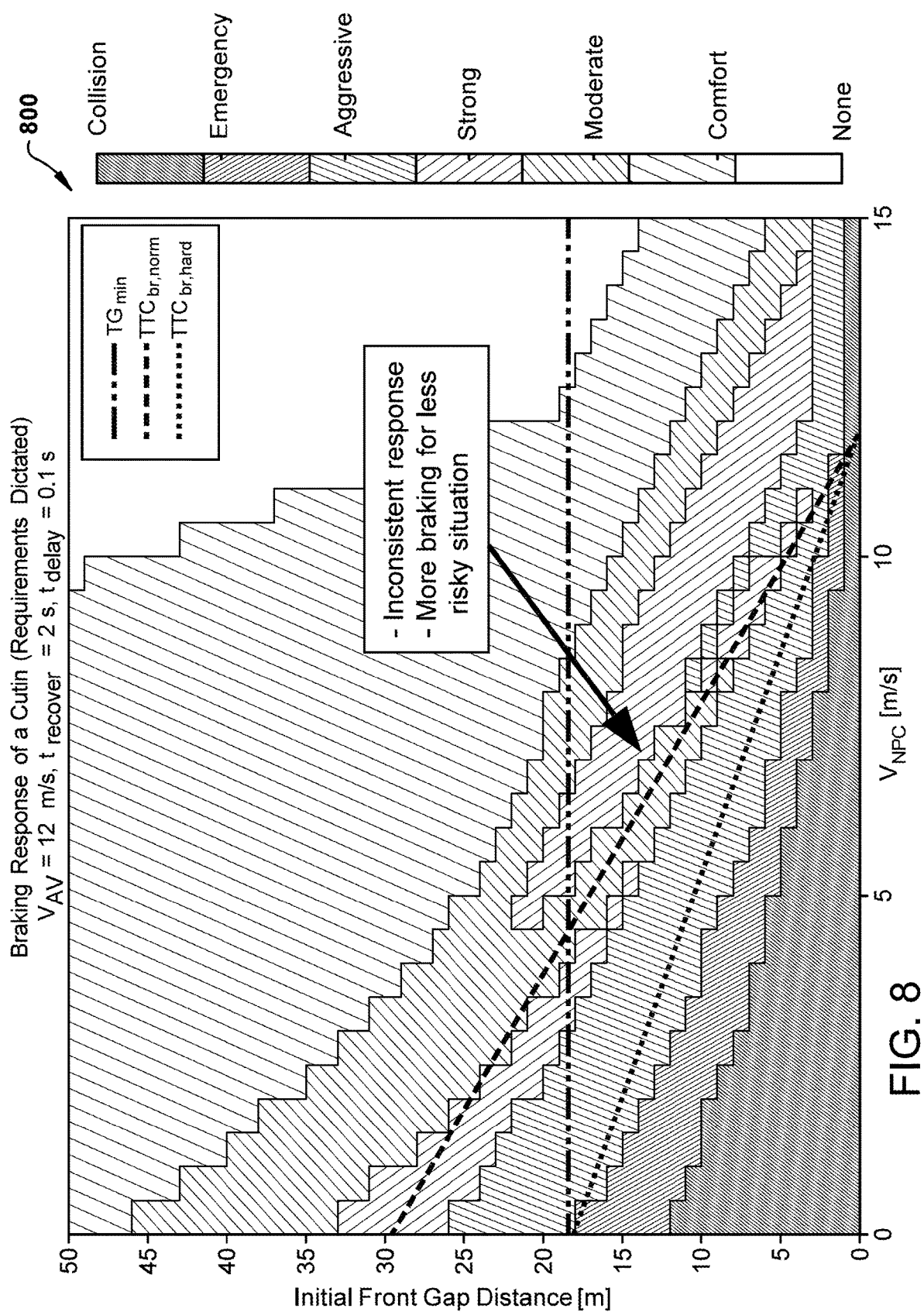
FIG. 8 is a graphical diagram of an example simulation that was performed based on a safe-response protocol to a cut-in vehicle, according to some embodiments of the disclosure.

Graphical data 700, 800 in FIGS. 7 and 8 also illustrate braking responses relative to the front gap distance between the autonomous vehicle and the cut-in vehicle based on the requirements discussed above in FIGS. 2, 3 and 4. In these simulations, the autonomous vehicle speed is set at 12 m/s, the recovery time gap is set at 1.5 second and 2 seconds, respectively, and the Control system and actuator response delay is 0.1 second.

Unlike FIGS. 3 and 5-6, the braking behavior represented in both FIGS. 7 and 8 indicate less consistent braking responses when the recovery time gap is set at 1.5 and 2 seconds, respectively than when the recovery time gap was set at 3 seconds. For instance, in FIGS. 7 and 8, there was more braking even in less risky situations (e.g., strong braking occurred even when the front gap distance was greater between the autonomous vehicle) as indicated at the area of the arrow tip.

Figure 9:
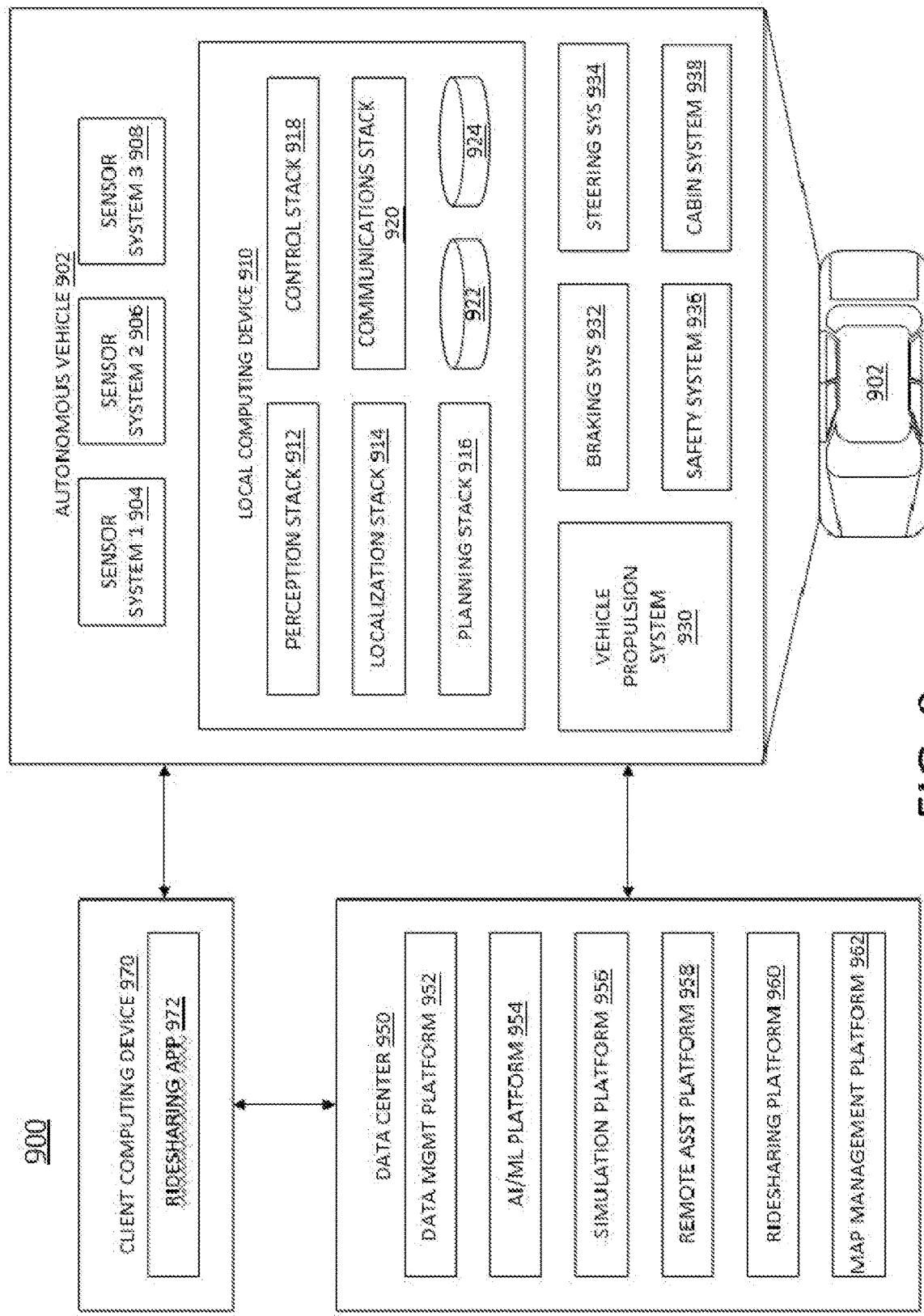
FIG. 9 illustrates an example system environment that can be used to facilitate autonomous vehicle dispatch and operations, according to some aspects of the disclosed technology.

Turning now to FIG. 9, this figure illustrates an example of an autonomous vehicle management system 900. One of ordinary skill in the art will understand that, for the autonomous vehicle management system 900 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the autonomous vehicle management system 900 includes an autonomous vehicle (AV) 902, a data center 950, and a client computing device 970. The AV 902, the data center 950, and the client computing device 970 can communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 902 can navigate about roadways without a human driver based on sensor signals generated by multiple sensor systems 904, 906, and 908. The sensor systems 904-908 can include different types of sensors and can be arranged about the AV 902. For instance, the sensor systems 904-908 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 904 can be a camera system, the sensor system 906 can be a LIDAR system, and the sensor system 908 can be a RADAR system. Other embodiments may include any other number and type of sensors.

AV 902 can also include several mechanical systems that can be used to maneuver or operate AV 902. For instance, the mechanical systems can include vehicle propulsion system 930, braking system 932, steering system 934, safety system 936, and cabin system 938, among other systems. Vehicle propulsion system 930 can include an electric motor, an internal combustion engine, or both. The braking system 932 can include an engine brake, a wheel braking system (e.g., a disc braking system that utilizes brake pads), hydraulics, actuators, and/or any other suitable componentry configured to assist in decelerating AV 902. The steering system 934 can include suitable componentry configured to control the direction of movement of the AV 902 during navigation. Safety system 936 can include lights and signal indicators, a parking brake, airbags, and so forth. The cabin system 938 can include cabin temperature control systems, in-cabin entertainment systems, and so forth. In some embodiments, the AV 902 may not include human driver actuators (e.g., steering wheel, handbrake, foot brake pedal, foot accelerator pedal, turn signal lever, window wipers, etc.) for controlling the AV 902. Instead, the cabin system 938 can include one or more client interfaces (e.g., Graphical User Interfaces (GUIs), Voice User Interfaces (VUIs), etc.) for controlling certain aspects of the mechanical systems 930-938.

AV 902 can additionally include a local computing device 910 that is in communication with the sensor systems 904-908, the mechanical systems 930-938, the data center 950, and the client computing device 970, among other systems. The local computing device 910 can include one or more processors and memory, including instructions that can be executed by the one or more processors. The instructions can make up one or more software stacks or components responsible for controlling the AV 902; communicating with the data center 950, the client computing device 970, and other systems; receiving inputs from riders, passengers, and other entities within the AV's environment; logging metrics collected by the sensor systems 904-908; and so forth. In this example, the local computing device 910 includes a perception stack 912, a mapping and localization stack 914, a planning stack 916, a control stack 918, a communications stack 920, an High Definition (HD) geospatial database 922, and an AV operational database 924, among other stacks and systems.

Perception stack 912 can enable the AV 902 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 904-908, the mapping and localization stack 914, the HD geospatial database 922, other components of the AV, and other data sources (e.g., the data center 950, the client computing device 970, third-party data sources, etc.). The perception stack 912 can detect and classify objects and determine their current and predicted locations, speeds, directions, and the like. In addition, the perception stack 912 can determine the free space around the AV 902 (e.g., to maintain a safe distance from other objects, change lanes, park the AV, etc.). The perception stack 912 can also identify environmental uncertainties, such as where to look for moving objects, flag areas that may be obscured or blocked from view, and so forth.

Mapping and localization stack 914 can determine the AV's position and orientation (pose) using different methods from multiple systems (e.g., GPS, IMUs, cameras, LIDAR, RADAR, ultrasonic sensors, the HD geospatial database 922, etc.). For example, in some embodiments, the AV 902 can compare sensor data captured in real-time by the sensor systems 904-908 to data in the HD geospatial database 922 to determine its precise (e.g., accurate to the order of a few centimeters or less) position and orientation. The AV 902 can focus its search based on sensor data from one or more first sensor systems (e.g., GPS) by matching sensor data from one or more second sensor systems (e.g., LIDAR). If the mapping and localization information from one system is unavailable, the AV 902 can use mapping and localization information from a redundant system and/or from remote data sources.

The planning stack 916 can determine how to maneuver or operate the AV 902 safely and efficiently in its environment. For example, the planning stack 916 can receive the location, speed, and direction of the AV 902, geospatial data, data regarding objects sharing the road with the AV 902 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 902 from one point to another. The planning stack 916 can determine multiple sets of one or more mechanical operations that the AV 902 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 916 can select from multiple backup plans to carry out. For example, while preparing to change lanes to turn right at an intersection, another vehicle may aggressively cut into the destination lane, making the lane change unsafe. The planning stack 916 could have already determined an alternative plan for such an event, and upon its occurrence, help to direct the AV 902 to go around the block instead of blocking a current lane while waiting for an opening to change lanes.

The control stack 918 can manage the operation of the vehicle propulsion system 930, the braking system 932, the steering system 934, the safety system 936, and the cabin system 938. The control stack 918 can receive sensor signals from the sensor systems 904-908 as well as communicate with other stacks or components of the local computing device 910 or a remote system (e.g., the data center 950) to effectuate operation of the AV 902. For example, the control stack 918 can implement the final path or actions from the multiple paths or actions provided by the planning stack 916. This can involve turning the routes and decisions from the planning stack 916 into commands for the actuators that control the AV's steering, throttle, brake, and drive unit.

The communication stack 920 can transmit and receive signals between the various stacks and other components of the AV 902 and between the AV 902, the data center 950, the client computing device 970, and other remote systems. The communication stack 920 can enable the local computing device 910 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 920 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 922 can store HD maps and related data of the streets upon which the AV 902 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 924 can store raw AV data generated by the sensor systems 904-908 and other components of the AV 902 and/or data received by the AV 902 from remote systems (e.g., the data center 950, the client computing device 970, etc.). In some embodiments, the raw AV data can include HD LIDAR point cloud data, image or video data, RADAR data, GPS data, and other sensor data that the data center 950 can use for creating or updating AV geospatial data as discussed further below with respect to FIG. 5 and elsewhere in the present disclosure.

The data center 950 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 950 can include one or more computing devices remote to the local computing device 910 for managing a fleet of AVs and AV-related services. For example, in addition to managing the AV 902, the data center 950 may also support a ridesharing service, a delivery service, a remote/roadside assistance service, street services (e.g., street mapping, street patrol, street cleaning, street metering, parking reservation, etc.), and the like.

The data center 950 can send and receive various signals to and from the AV 902 and the client computing device 970. These signals can include sensor data captured by the sensor systems 904-908, roadside assistance requests, software updates, ridesharing pick-up and drop-off instructions, and so forth. In this example, the data center 950 includes one or more of a data management platform 952, an Artificial Intelligence/Machine Learning (AI/ML) platform 954, a simulation platform 956, a remote assistance platform 958, a ridesharing platform 960, and a map management platform 962, among other systems.

Data management platform 952 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 950 can access data stored by the data management platform 952 to provide their respective services.

The AI/ML platform 954 can provide the infrastructure for training and evaluating machine learning algorithms for operating the AV 902, the simulation platform 956, the remote assistance platform 958, the ridesharing platform 960, the map management platform 962, and other platforms and systems. Using the AI/ML platform 954, data scientists can prepare data sets from the data management platform 952; select, design, and train machine learning models; evaluate, refine, and deploy the models; maintain, monitor, and retrain the models; and so on.

The simulation platform 956 can enable testing and validation of the algorithms, machine learning models, neural networks, and other development efforts for the AV 902, the remote assistance platform 958, the ridesharing platform 960, the map management platform 962, and other platforms and systems. The simulation platform 956 can replicate a variety of driving environments and/or reproduce real-world scenarios from data captured by the AV 902, including rendering geospatial information and road infrastructure (e.g., streets, lanes, crosswalks, traffic lights, stop signs, etc.) obtained from the map management platform 962; modeling the behavior of other vehicles, bicycles, pedestrians, and other dynamic elements; simulating inclement weather conditions, different traffic scenarios; and so on.

The remote assistance platform 958 can generate and transmit instructions regarding the operation of the AV 902. For example, in response to an output of the AI/ML platform 954 or other system of the data center 950, the remote assistance platform 958 can prepare instructions for one or more stacks or other components of the AV 902.

The ridesharing platform 960 can interact with a customer of a ridesharing service via a ridesharing application 972 executing on the client computing device 970. The client computing device 970 can be any type of computing system, including a server, desktop computer, laptop, tablet, smartphone, smart wearable device (e.g., smart watch; smart eyeglasses or other Head-Mounted Display (HMD); smart car pods or other smart in-car, on-car, or over-ear device; etc.), gaming system, or other general purpose computing device for accessing the ridesharing application 972. The client computing device 970 can be a customer's mobile computing device or a computing device integrated with the AV 902 (e.g., the local computing device 910). The ridesharing platform 960 can receive requests to be picked up or dropped off from the ridesharing application 972 and dispatch the AV 902 for the trip.

Map management platform 962 can provide a set of tools for the manipulation and management of geographic and spatial (geospatial) and related attribute data. The data management platform 952 can receive LIDAR point cloud data, image data (e.g., still image, video, etc.), RADAR data, GPS data, and other sensor data (e.g., raw data) from one or more AVs 902, Unmanned Aerial Vehicles (UAVs), satellites, third-party mapping services, and other sources of geospatially referenced data. The raw data can be processed, and map management platform 962 can render base representations (e.g., tiles (2D), bounding volumes (3D), etc.) of the AV geospatial data to enable users to view, query, label, edit, and otherwise interact with the data. Map management platform 962 can manage workflows and tasks for operating on the AV geospatial data. Map management platform 962 can control access to the AV geospatial data, including granting or limiting access to the AV geospatial data based on user-based, role-based, group-based, task-based, and other attribute-based access control mechanisms. Map management platform 962 can provide version control for the AV geospatial data, such as to track specific changes that (human or machine) map editors have made to the data and to revert changes when necessary. Map management platform 962 can administer release management of the AV geospatial data, including distributing suitable iterations of the data to different users, computing devices, AVs, and other consumers of HD maps. Map management platform 962 can provide analytics regarding the AV geospatial data and related data, such as to generate insights relating to the throughput and quality of mapping tasks.

In some embodiments, the map viewing services of map management platform 962 can be modularized and deployed as part of one or more of the platforms and systems of the data center 950. For example, the AI/ML platform 954 may incorporate the map viewing services for visualizing the effectiveness of various object detection or object classification models, the simulation platform 956 may incorporate the map viewing services for recreating and visualizing certain driving scenarios, the remote assistance platform 958 may incorporate the map viewing services for replaying traffic incidents to facilitate and coordinate aid, the ridesharing platform 960 may incorporate the map viewing services into the client application 972 to enable passengers to view the AV 902 in transit en route to a pick-up or drop-off location, and so on.

Figure 10:
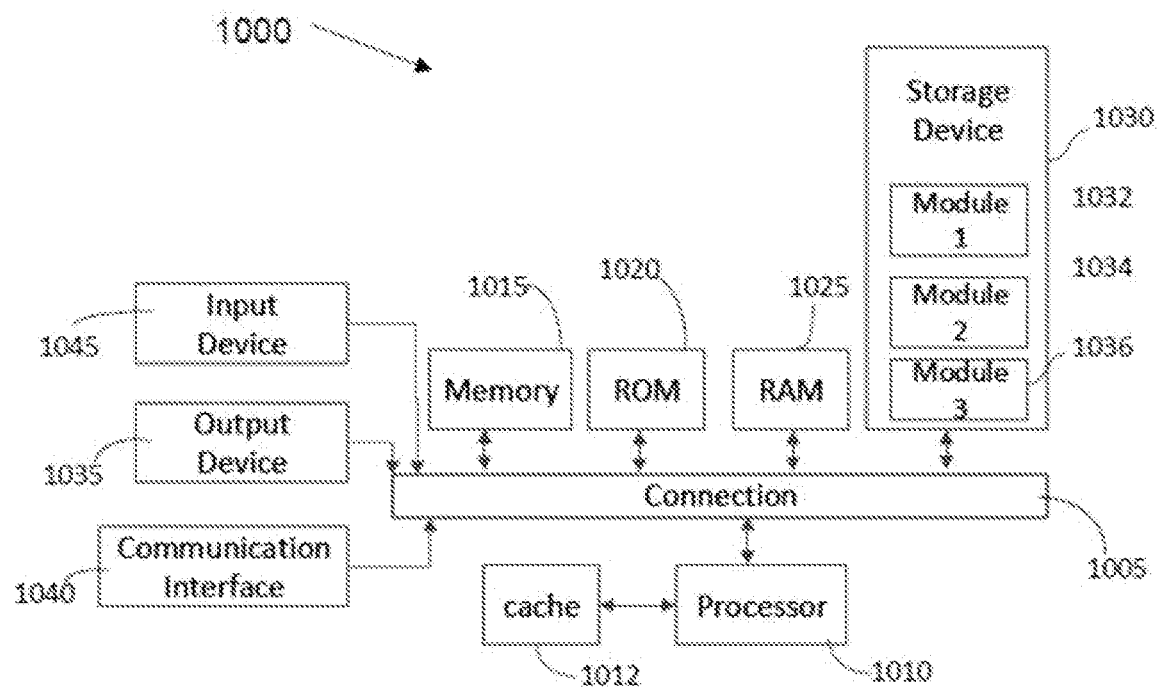
FIG. 10 illustrates an example processor-based system with which some aspects of the subject technology can be implemented.

FIG. 10 illustrates an example processor-based system with which some aspects of the subject technology can be implemented. For example, processor-based system 1000 can be any computing device making up, or any component thereof in which the components of the system are in communication with each other using connection 1005. Connection 1005 can be a physical connection via a bus, or a direct connection into processor 1010, such as in a chipset architecture. Connection 1005 can also be a virtual connection, networked connection, or logical connection.

In some embodiments, computing system 1000 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1000 includes at least one processing unit (Central Processing Unit (CPU) or processor) 1010 and connection 1005 that couples various system components including system memory 1015, such as Read-Only Memory (ROM) 1020 and Random-Access Memory (RAM) 1025 to processor 1010. Computing system 1000 can include a cache of high-speed memory 1012 connected directly with, in close proximity to, or integrated as part of processor 1010.

Processor 1010 can include any general-purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms known to those of skill in the art. In some instances, multimodal systems can enable a user to provide multiple types of input/output to communicate with computing system 1000. Computing system 1000 can include communications interface 1040, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 1030 can include software services, servers, services, etc., that when the code that defines such software is executed by the processor 1010, it causes the system 1000 to perform a function. In some embodiments, a hardware service that performs a particular function can include the software component stored in a computer-readable medium in connection with the necessary hardware components, such as processor 1010, connection 1005, output device 1035, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of controls system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

SELECT EXAMPLES

Example 1 provides an autonomous vehicle comprising: an onboard controls system comprising a speed control component that monitors and controls speed, acceleration and deceleration of the autonomous vehicle and determines a following behavior when a cut-in vehicle cuts in front of the autonomous vehicle, an object sensing component that detects the cut-in vehicle moving into a path of the autonomous vehicle and communicates detection of the cut-in vehicle to the speed control component, an external speed detection component that detects speed data of the cut-in vehicle and communicates the speed data to the speed control component, wherein the speed control component determines an amount of deceleration necessary for the autonomous vehicle based on a recovery time gap, distance between the autonomous vehicle and the cut-in vehicle, the speed of the cut-in vehicle relative to the autonomous vehicle speed, and time to collision.

Example 2 provides an autonomous vehicle according to one or more of the preceding and/or following examples, wherein the speed control component further causes the autonomous vehicle to decelerate by the amount of deceleration necessary to respond to the cut-in vehicle to avoid a collision.

Example 3 provides an autonomous vehicle according to one or more of the preceding and/or following examples, wherein the speed control component determines a longitudinal gap distance between the autonomous vehicle and the cut-in vehicle, a longitudinal distance associated with the front buffer of the autonomous vehicle, a time gap of the autonomous vehicle relative to the cut-in vehicle, and a time to collision of the autonomous vehicle relative to the cut-in vehicle.

Example 4 provides an autonomous vehicle according to one or more of the preceding and/or following examples, wherein the amount of deceleration is selected from one of the following: emergency deceleration, aggressive deceleration, some deceleration, moderate deceleration, recovery deceleration, any deceleration and no deceleration.

Example 5 provides an autonomous vehicle according to one or more of the preceding and/or following examples, wherein the amount of deceleration indicates emergency deceleration when a longitudinal gap distance between the autonomous vehicle and the cut-in vehicle is less than or equal to a longitudinal distance associated with a set limit for longitudinal positional uncertainty.

Example 6 provides an autonomous vehicle according to one or more of the preceding and/or following examples, wherein the amount of deceleration indicates an aggressive deceleration when any one of the following is determined: (1) the longitudinal gap distance between the autonomous vehicle and the cut-in vehicle is less than or equal to a longitudinal distance associated with a front buffer of the autonomous vehicle and (2) a time to collision of the autonomous vehicle is less than or equal to a time to collision threshold for hard braking and a time gap for the autonomous vehicle is less than the minimum time gap for the autonomous vehicle speed.

Example 7 provides an autonomous vehicle according to one or more of the preceding and/or following examples, wherein the amount of deceleration indicates a moderate deceleration when a time to collision of the autonomous vehicle is less than or equal to a time to collision threshold for normal braking and a time gap for the autonomous vehicle is less than the minimum time gap for the autonomous vehicle speed.

Example 8 provides an autonomous vehicle according to one or more of the preceding and/or following examples, wherein the amount of deceleration indicates one of the following: recovery deceleration when a time to collision of the autonomous vehicle is greater than a time to collision threshold for normal braking and a time gap for the autonomous vehicle is less than the minimum time gap for the autonomous vehicle speed; and any deceleration when the time to collision of the autonomous vehicle less than or equal to the time to collision threshold for normal braking and a time gap for the autonomous vehicle is less than the minimum time gap for the autonomous vehicle speed.

Example 9 provides a method for determining a following behavior for an autonomous vehicle relative to a cut-in vehicle that cuts in front of the autonomous vehicle comprising determining a longitudinal gap distance between the autonomous vehicle and the cut-in vehicle, determining a longitudinal distance associated with the front buffer of the autonomous vehicle, determining a time gap of the autonomous vehicle relative to the cut-in vehicle; and determining a minimum time gap for the autonomous vehicle speed.

Example 10 provides a method according to one or more of the preceding and/or following examples and further includes applying emergency deceleration when the longitudinal gap distance between the autonomous vehicle and the cut-in vehicle is less than or equal to the longitudinal distance associated with a set limit for longitudinal positional uncertainty, and applying aggressive deceleration when the longitudinal gap distance between the autonomous vehicle and the cut-in vehicle is less than or equal to the longitudinal distance associated with the front buffer of the autonomous vehicle.

Example 11 provides a method according to one or more of the preceding and/or following examples, wherein the set limit for longitudinal positional uncertainty is at least 80th percentile or higher.

Example 12 provides a method according to one or more of the preceding and/or following examples and further includes determining a time to collision of the autonomous vehicle relative to the cut-in vehicle, determining a time to collision threshold for hard braking for the autonomous vehicle, determining a time to collision threshold for normal braking for the autonomous vehicle, and selecting an amount of deceleration based on longitudinal gap distance between the autonomous vehicle and the cut-in vehicle, a longitudinal distance associated with the front buffer of the autonomous vehicle, a time gap of the autonomous vehicle relative to the cut-in vehicle, and a time to collision of the autonomous vehicle relative to the cut-in vehicle.

Example 13 provides a method according to one or more of the preceding and/or following examples and further includes applying aggressive deceleration when the time to collision of the autonomous vehicle is less than or equal to a time to collision threshold for hard braking and a time gap for the autonomous vehicle is less than the minimum time gap for the autonomous vehicle speed.

Example 14 provides a method according to one or more of the preceding and/or following examples and further includes applying moderate deceleration when the time to collision of the autonomous vehicle is less than or equal to a time to collision threshold for normal braking and a time gap for the autonomous vehicle is less than the minimum time gap for the autonomous vehicle speed.

Example 15 provides a method according to one or more of the preceding and/or following examples and further includes applying recovery deceleration when the time to collision of the autonomous vehicle is greater than a time to collision threshold for normal braking and a time gap for the autonomous vehicle is less than the minimum time gap for the autonomous vehicle speed.

Example 16 provides a method according to one or more of the preceding and/or following examples and further includes applying any deceleration when the time to collision of the autonomous vehicle less than or equal to the time to collision threshold for normal braking and a time gap for the autonomous vehicle is less than the minimum time gap for the autonomous vehicle speed.

Example 17 provides a method according to one or more of the preceding and/or following examples, wherein the minimum time gap of the autonomous vehicle is at least 3 seconds.

Example 18 provides a method for determining a following behavior for an autonomous vehicle relative to a leading vehicle that cuts in front of the autonomous vehicle according to one or more of the preceding and/or following examples including determining a longitudinal gap distance between the autonomous vehicle and the cut-in vehicle, determining a longitudinal distance associated with the front buffer of the autonomous vehicle, determining a time gap of the autonomous vehicle relative to the cut-in vehicle, determining a minimum time gap for the autonomous vehicle speed based on detected road conditions, determining a time to collision of the autonomous vehicle relative to the cut-in vehicle, determining a hard braking time to collision threshold for the autonomous vehicle, determining a normal braking time to collision threshold for the autonomous vehicle, and selecting an amount of deceleration as the following behavior based on the road conditions and which of any thresholds relating to the longitudinal gap distance, the longitudinal distance, the time gap, the minimum time gap for the autonomous vehicle speed, the time to collision threshold for hard and normal braking have been exceeded.

Example 19 provides a method according to one or more of the preceding and/or following examples and further includes applying emergency deceleration when the longitudinal gap distance between the autonomous vehicle and the cut-in vehicle is less than or equal to the longitudinal distance associated with a set limit for longitudinal positional uncertainty and applying aggressive deceleration when the longitudinal gap distance between the autonomous vehicle and the cut-in vehicle is less than or equal to the longitudinal distance associated with the front buffer of the autonomous vehicle.

Example 20 provides a method according to one or more of the preceding and/or following examples and further includes applying aggressive deceleration when the time to collision of the autonomous vehicle is less than or equal to a time to collision threshold for hard braking and a time gap for the autonomous vehicle is less than the minimum time gap for the autonomous vehicle speed, applying moderate deceleration when the time to collision of the autonomous vehicle is less than or equal to a time to collision threshold for normal braking and a time gap for the autonomous vehicle is less than the minimum time gap for the autonomous vehicle speed, applying recovery deceleration when the time to collision of the autonomous vehicle is greater than a time to collision threshold for normal braking and a time gap for the autonomous vehicle is less than the minimum time gap for the autonomous vehicle speed.

Example 21 provides a method according to one or more of the preceding and/or following examples wherein no deceleration is applied when the time to collision of autonomous vehicle is greater than the time to collision normal braking threshold and the time gap of the autonomous vehicle is greater than or equal to the minimum time gap.

Example 22 provides a method according to one or more of the preceding and/or following examples wherein the longitudinal distance is associated with the 95th percentile limit for longitudinal positional uncertainty when determining whether a threshold for emergency deceleration has been exceeded or satisfied or violated.

Example 23 provides a method according to one or more of the preceding and/or following examples wherein at least one following behavior is applied to the autonomous vehicle when a road actor vehicle cuts in front of it: emergency deceleration, aggressive deceleration, moderate deceleration, some deceleration or following without deceleration.

Example 24 provides a method according to one or more of the preceding and/or following examples wherein a minimum time gap to recover for the autonomous vehicle is at least 3 seconds.

Example 25 provides an autonomous vehicle configured to determine a following behavior for an autonomous vehicle behind a cut-in vehicle (e.g., a vehicle that cuts in front of the autonomous vehicle), including an onboard controls system comprising a speed control component that monitors and controls speed, acceleration and deceleration of the autonomous vehicle and determines a following behavior when a cut-in vehicle cuts in front of the autonomous vehicle, an object sensing component that detects the cut-in vehicle moving into a path of the autonomous vehicle and communicates detection of the cut-in vehicle to the speed control component, an external speed detection component that detects speed data of the cut-in vehicle and communicates the speed data to the speed control component, wherein the speed control component determines an amount of deceleration necessary for the autonomous vehicle based on a recovery time gap, distance between the autonomous vehicle and the cut-in vehicle, the speed of the cut-in vehicle relative to the autonomous vehicle speed, and time to collision.

Example 26 provides an autonomous vehicle according to one or more of the preceding and/or following examples, wherein the speed control component further causes the autonomous vehicle to decelerate by the amount of deceleration necessary to respond to the cut-in vehicle to avoid a collision.

Example 27 provides an autonomous vehicle according to one or more of the preceding and/or following examples, wherein the speed control component determines a longitudinal gap distance between the autonomous vehicle and the cut-in vehicle, a longitudinal distance associated with the front buffer of the autonomous vehicle, a time gap of the autonomous vehicle relative to the cut-in vehicle, and a time to collision of the autonomous vehicle relative to the cut-in vehicle.

Example 28 provides an autonomous vehicle according to one or more of the preceding and/or following examples, wherein the amount of deceleration is selected from one of the following: emergency deceleration, aggressive deceleration, some deceleration, moderate deceleration, recovery deceleration, any deceleration and no deceleration.

Example 29 provides an autonomous vehicle according to one or more of the preceding and/or following examples, wherein the amount of deceleration indicates emergency deceleration when a longitudinal gap distance between the autonomous vehicle and the cut-in vehicle is less than or equal to a longitudinal distance associated with a set limit for longitudinal positional uncertainty.

Example 30 provides an autonomous vehicle according to one or more of the preceding and/or following examples, wherein the amount of deceleration indicates an aggressive deceleration when any one of the following is determined: (1) the longitudinal gap distance between the autonomous vehicle and the cut-in vehicle is less than or equal to a longitudinal distance associated with a front buffer of the autonomous vehicle and (2) a time to collision of the autonomous vehicle is less than or equal to a time to collision threshold for hard braking and a time gap for the autonomous vehicle is less than the minimum time gap for the autonomous vehicle speed.

Example 31 provides an autonomous vehicle according to one or more of the preceding and/or following examples, wherein the amount of deceleration indicates a moderate deceleration when a time to collision of the autonomous vehicle is less than or equal to a time to collision threshold for normal braking and a time gap for the autonomous vehicle is less than the minimum time gap for the autonomous vehicle speed.

Example 32 provides an autonomous vehicle according to one or more of the preceding and/or following examples, wherein the amount of deceleration indicates one of the following: recovery deceleration when a time to collision of the autonomous vehicle is greater than a time to collision threshold for normal braking and a time gap for the autonomous vehicle is less than the minimum time gap for the autonomous vehicle speed; and any deceleration when the time to collision of the autonomous vehicle less than or equal to the time to collision threshold for normal braking and a time gap for the autonomous vehicle is less than the minimum time gap for the autonomous vehicle speed.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A system for determining a following behavior for an autonomous vehicle relative to a cut-in vehicle for use in the autonomous vehicle comprising:
   an onboard controls system comprising:
      a speed control component that monitors and controls speed, acceleration and deceleration of the autonomous vehicle and determines a following behavior when a cut-in vehicle cuts in front of the autonomous vehicle;
      an object sensing component that detects the cut-in vehicle moving into a path of the autonomous vehicle and communicates detection of the cut-in vehicle to the speed control component;
      an external speed detection component that detects speed data of the cut-in vehicle and communicates the speed data to the speed control component,
      wherein the speed control component determines an amount of deceleration necessary for the autonomous vehicle based on a recovery time gap, distance between the autonomous vehicle and the cut-in vehicle, the speed of the cut-in vehicle relative to the autonomous vehicle speed, and time to collision.

2. The system of claim 1, wherein the speed control component further causes the autonomous vehicle to decelerate by the amount of deceleration necessary to respond to the cut-in vehicle.

3. The system of claim 1, wherein the speed control component determines a longitudinal gap distance between the autonomous vehicle and the cut-in vehicle, a longitudinal distance associated with the front buffer of the autonomous vehicle, a time gap of the autonomous vehicle relative to the cut-in vehicle, and a time to collision of the autonomous vehicle relative to the cut-in vehicle.

4. The system of claim 1 wherein the amount of deceleration is selected from one of the following: emergency deceleration, aggressive deceleration, some deceleration, moderate deceleration, recovery deceleration, any deceleration and no deceleration.

5. The system of claim 1, wherein the amount of deceleration indicates emergency deceleration when a longitudinal gap distance between the autonomous vehicle and the cut-in vehicle is less than or equal to a longitudinal distance associated with a set limit for longitudinal positional uncertainty.

6. The system of claim 1, wherein the amount of deceleration indicates an aggressive deceleration when any one of the following is determined:
   the longitudinal gap distance between the autonomous vehicle and the cut-in vehicle is less than or equal to a longitudinal distance associated with a front buffer of the autonomous vehicle; and
   a time to collision of the autonomous vehicle is less than or equal to a time to collision threshold for hard braking and a time gap for the autonomous vehicle is less than the minimum time gap for the autonomous vehicle speed.

7. The system of claim 1, wherein the amount of deceleration indicates a moderate deceleration when a time to collision of the autonomous vehicle is less than or equal to a time to collision threshold for normal braking and a time gap for the autonomous vehicle is less than the minimum time gap for the autonomous vehicle speed.

8. The system of claim 1, wherein the amount of deceleration indicates one of the following:
   recovery deceleration when a time to collision of the autonomous vehicle is greater than a time to collision threshold for normal braking and a time gap for the autonomous vehicle is less than the minimum time gap for the autonomous vehicle speed; and
   any deceleration when the time to collision of the autonomous vehicle less than or equal to the time to collision threshold for normal braking and a time gap for the autonomous vehicle is less than the minimum time gap for the autonomous vehicle speed.

9. A method for determining a following behavior for an autonomous vehicle relative to a cut-in vehicle that cuts in front of the autonomous vehicle comprising:
   determining a longitudinal gap distance between the autonomous vehicle and the cut-in vehicle;

determining a longitudinal distance associated with the front buffer of the autonomous vehicle;

determining a time gap of the autonomous vehicle relative to the cut-in vehicle; and determining a minimum time gap for the autonomous vehicle speed.

10. The method of claim 9 further comprising:

applying emergency deceleration when the longitudinal gap distance between the autonomous vehicle and the cut-in vehicle is less than or equal to the longitudinal distance associated with a set limit for longitudinal positional uncertainty; and applying aggressive deceleration when the longitudinal gap distance between the autonomous vehicle and the cut-in vehicle is less than or equal to the longitudinal distance associated with the front buffer of the autonomous vehicle.

11. The method of claim 10, wherein the set limit for longitudinal positional uncertainty is at least $80^{th}$ percentile or higher.

12. The method of claim 9 further comprising:

determining a time to collision of the autonomous vehicle relative to the cut-in vehicle;

determining a time to collision threshold for hard braking for the autonomous vehicle;

determining a time to collision threshold for normal braking for the autonomous vehicle; and selecting an amount of deceleration based on longitudinal gap distance between the autonomous vehicle and the cut-in vehicle, a longitudinal distance associated with the front buffer of the autonomous vehicle, a time gap of the autonomous vehicle relative to the cut-in vehicle, and a time to collision of the autonomous vehicle relative to the cut-in vehicle.

13. The method of claim 12 further comprising applying aggressive deceleration when the time to collision of the autonomous vehicle is less than or equal to a time to collision threshold for hard braking and a time gap for the autonomous vehicle is less than the minimum time gap for the autonomous vehicle speed.

14. The method of claim 12 further comprising applying moderate deceleration when the time to collision of the autonomous vehicle is less than or equal to a time to collision threshold for normal braking and a time gap for the autonomous vehicle is less than the minimum time gap for the autonomous vehicle speed.

15. The method of claim 12 further comprising applying recovery deceleration when the time to collision of the autonomous vehicle is greater than a time to collision threshold for normal braking and a time gap for the autonomous vehicle is less than the minimum time gap for the autonomous vehicle speed.

16. The method of claim 12 further comprising applying any deceleration when the time to collision of the autonomous vehicle less than or equal to the time to collision threshold for normal braking and a time gap for the autonomous vehicle is less than the minimum time gap for the autonomous vehicle speed.

17. The method of claim 9, wherein the minimum time gap of the autonomous vehicle is at least 3 seconds.

18. An autonomous vehicle configured to determine a following behavior for the autonomous vehicle relative to a cut-in vehicle comprising:

an onboard controls system comprising:

a speed control component that monitors and controls speed, acceleration and deceleration of the autonomous vehicle and determines a following behavior when a cut-in vehicle cuts in front of the autonomous vehicle;

an object sensing component that detects the cut-in vehicle moving into a path of the autonomous vehicle and communicates detection of the cut-in vehicle to the speed control component;

an external speed detection component that detects speed data of the cut-in vehicle and communicates the speed data to the speed control component, wherein the speed control component determines an amount of deceleration necessary for the autonomous vehicle based on a recovery time gap, distance between the autonomous vehicle and the cut-in vehicle, the speed of the cut-in vehicle relative to the autonomous vehicle speed, and time to collision.

19. The autonomous vehicle of claim 1, wherein the speed control component further causes the autonomous vehicle to decelerate by the amount of deceleration necessary to respond to the cut-in vehicle.

20. The autonomous vehicle of claim 1, wherein the speed control component determines a longitudinal gap distance between the autonomous vehicle and the cut-in vehicle, a longitudinal distance associated with the front buffer of the autonomous vehicle, a time gap of the autonomous vehicle relative to the cut-in vehicle, and a time to collision of the autonomous vehicle relative to the cut-in vehicle.

* * * * *